US006863030B2

(12) United States Patent
Axelrod

(10) Patent No.: US 6,863,030 B2
(45) Date of Patent: Mar. 8, 2005

(54) ROLL-TOP PET CARRIER

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 0 days.

(21) Appl. No.: 10/348,995

(22) Filed: Jan. 22, 2003

(65) Prior Publication Data

US 2004/0139923 A1 Jul. 22, 2004

(51) Int. Cl.[7] .................................................. A01K 1/03
(52) U.S. Cl. ...................... 119/498; 119/453
(58) Field of Search ................................ 119/498, 499, 119/452, 453, 461, 473, 474, 482, 484; D30/109; 220/7

(56) References Cited

U.S. PATENT DOCUMENTS

| 1,127,872 A | 2/1915 | Duhan | |
| 2,524,229 A | 10/1950 | Krueger | 119/17 |
| 3,048,147 A | 8/1962 | McKean | 119/19 |
| 3,184,146 A | 5/1965 | Hurley | 229/41 |
| 3,284,273 A | 11/1966 | Prentice | 161/83 |
| 3,628,827 A | 12/1971 | Bailey et al. | 296/137 |
| 3,849,952 A | 11/1974 | Hanaoka | 52/79 |
| 3,896,766 A | 7/1975 | Martin | 119/17 |
| 4,006,713 A | 2/1977 | Hawley, III | 119/19 |
| 4,108,517 A | 8/1978 | Tomalinas, Jr. et al. | 312/297 |
| 4,181,612 A | 1/1980 | Trail | 210/169 |
| 4,195,593 A | 4/1980 | Dunn | 119/19 |
| 4,397,398 A * | 8/1983 | Watanabe | 220/7 |
| 4,467,572 A | 8/1984 | Somers et al. | 52/70 |
| 4,484,540 A | 11/1984 | Yamamoto | 119/19 |
| 4,527,512 A | 7/1985 | Sugiura | 119/19 |
| 4,576,116 A | 3/1986 | Binkert | 119/19 |
| 4,590,885 A | 5/1986 | Sugiura | 119/19 |
| 4,603,658 A | 8/1986 | Garnsey | 119/19 |
| 4,649,578 A | 3/1987 | Vargo | 4/449 |
| 4,792,082 A | 12/1988 | Williamson | 229/103 |
| 4,838,204 A | 6/1989 | Young | 119/17 |
| 4,869,206 A | 9/1989 | Spina | 119/17 |
| 4,940,016 A | 7/1990 | Heath | 119/1 |
| 5,000,121 A | 3/1991 | Daily | 199/17 |
| 5,010,848 A | 4/1991 | Rankin | 119/26 |
| 5,014,649 A | 5/1991 | Taft | 119/168 |
| 5,016,570 A | 5/1991 | Henson | 119/19 |
| 5,038,721 A | 8/1991 | Ouellette et al. | 119/167 |
| 5,107,639 A | 4/1992 | Morin et al. | 52/71 |
| 5,121,710 A | 6/1992 | Gonzalez | 119/19 |

(List continued on next page.)

FOREIGN PATENT DOCUMENTS

| FR | 2388491 | 11/1978 | A01K/1/02 |
| GB | 1427201 | 3/1976 | A01K/1/00 |
| WO | WO 01/20090 | 3/2001 | E04B/1/344 |

*Primary Examiner*—Teri P. Luu
*Assistant Examiner*—Kimberly S. Smith
(74) *Attorney, Agent, or Firm*—Grossman, Tucker, Perreault & Pfieger, PLLC

(57) ABSTRACT

A collapsible carrier for an animal comprising a base panel, the base panel having a first end and a second end and containing a floor surface wherein the floor surface includes upwardly extending sidewalls, first and second members end members hingedly attached to the upwardly extending sidewalls at the first and second ends of the base panel. Each of the end members have guideways wherein the base panel and the end members are configured to define an access opening to the base panel floor surface. A slidable door for closing the access opening is provided, wherein the slidable door comprises a leading and a trailing edge, the leading and trailing edge extending between the end members, including a portion that extends into the guideway of the end members. The slidable door is movable along the guideway in the end members to conform to the shape of the end members thereby extending over the floor surface of the base panel and the slidable door is also movable to a retracted position between the upwardly extending sidewall in said base panel.

21 Claims, 4 Drawing Sheets

U.S. PATENT DOCUMENTS

| | | | |
|---|---|---|---|
| 5,133,294 A | 7/1992 | Reid | 119/96 |
| 5,148,771 A | 9/1992 | Schuett et al. | 119/17 |
| 5,184,574 A | 2/1993 | Kirk et al. | 119/162 |
| 5,335,618 A | 8/1994 | Zarola | 119/19 |
| 5,452,681 A | 9/1995 | Ho | 119/17 |
| 5,465,686 A | 11/1995 | Monetti et al. | 119/168 |
| 5,467,734 A * | 11/1995 | Ho | 119/497 |
| 5,493,818 A | 2/1996 | Wilson | 52/71 |
| 5,503,107 A | 4/1996 | Satcher et al. | 119/19 |
| 5,522,344 A | 6/1996 | Demurjian | 119/474 |
| 5,549,073 A | 8/1996 | Askins et al. | 119/474 |
| 5,669,331 A | 9/1997 | Richmond | 119/497 |
| 5,671,698 A | 9/1997 | Farrugia | 119/497 |
| 5,715,772 A | 2/1998 | Kamrath et al. | 119/169 |
| 5,752,470 A | 5/1998 | Koneke | 119/499 |
| 5,769,028 A | 6/1998 | Deckys | 119/496 |
| 5,803,018 A | 9/1998 | Liou | 119/461 |
| 5,839,392 A | 11/1998 | Pemberton et al. | 119/498 |
| 5,950,568 A | 9/1999 | Axelrod et al. | 119/499 |
| 5,967,090 A | 10/1999 | Hui | 119/497 |
| 6,131,534 A | 10/2000 | Axelrod | 119/499 |
| 6,345,591 B1 | 2/2002 | Richmond | 119/497 |
| 6,394,036 B2 | 5/2002 | Burns et al. | 119/497 |
| 6,408,797 B2 | 6/2002 | Pivonka et al. | 119/498 |

* cited by examiner

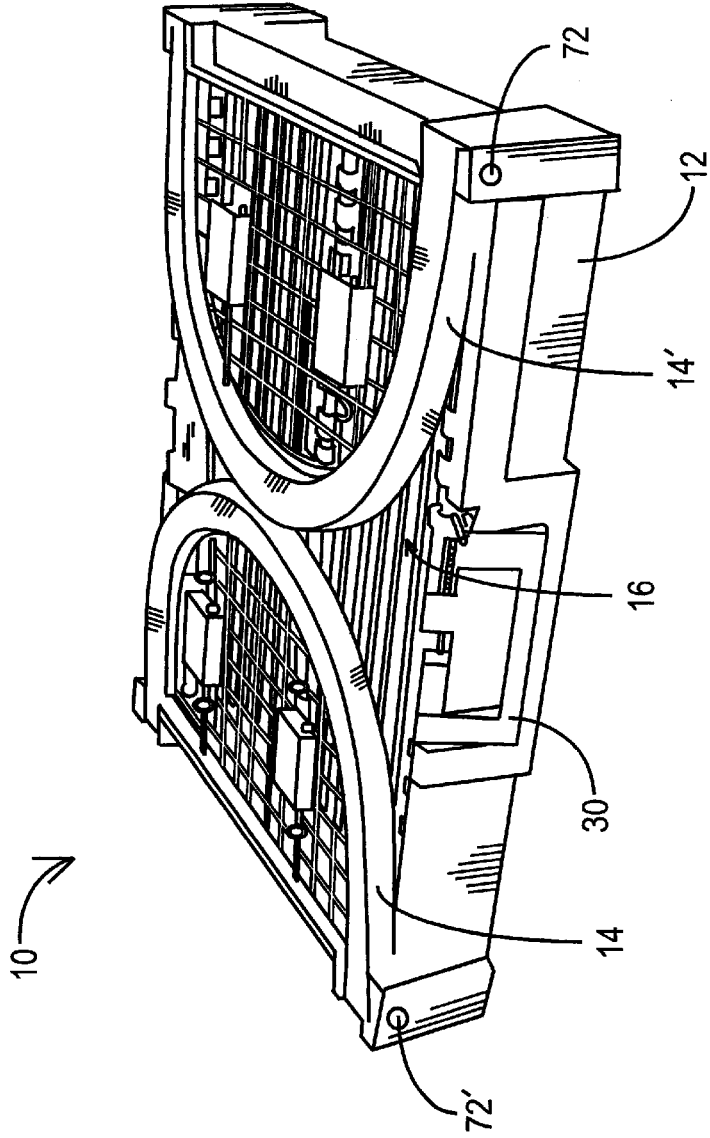
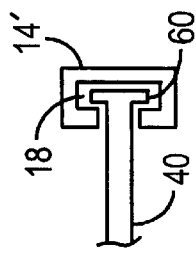

ROLL-TOP PET CARRIER

FIELD OF INVENTION

This invention is directed at a carrier for pets which can be easily and quickly collapsed and folded up when not in use. More particularly, this invention is directed at pet carriers which are used for transporting smaller to medium-sized animals and which can be collapsed to suitcase size and carried, stored or transported with ease. The present invention provides a pet carrier with slidable roll-away sides that retract into a base and ends that fold down and a handle for carrying. The carrier is preferably made primarily of plastic which allows for light weight, low cost manufacture and easy cleaning.

BACKGROUND OF THE INVENTION

Most families have one or more small pets. In today's very mobile society, it is desirable to take all of the family members, including the pets, on trips whether by bus, train, car or airplane. Pets must be contained during travel for both their safety and the safety of others. In motor vehicles, it is rapidly being recognized that animals need some sort of restraint or containment to protect them during rapid stops or crashes.

In airline travel, all but the very smallest of animals are transported in pet carriers or cages of some sort, often in the freight compartment. These carriers or cages may be rented from the transporter or provided by the pet owner. Certainly, rented carriers are expensive and not as familiar to the pet. Purchased pet carriers are often bulky, heavy and inconvenient to store due to their size. Temporary housing for the storage or transporting of animals is often carried out in containers or cages that take up the same amount of space when occupied as well they are not in use.

A variety of pet carriers have been reported in the prior art, all aimed in one form or another to facilitate pet transportation. Specifically, pet carriers are commonly used by pet owners for carrying their pets on trips or as a means for containing the pets when the pets are shipped from one point to another. Pet carriers also commonly double as sleep quarters for the pet so that the owner may contain the pet overnight to prevent the pet from wandering and potentially damaging the home or hotel room which the owner is occupying.

A number of United States Patents are directed at "collapsible" pet carriers which have soft sides and windows that are formed of a mesh to allow ventilation. U.S. Pat. No. 6,394,036 B2 to Designer Products, Inc. is illustrative of this type of patent. This type of soft carrier is not particularly sturdy, say for use with heavier animals, contains numerous zippers capable of getting caught in the animal's fur and does not allow good visibility so that the animal may see out.

Other patents include U.S. Pat. No. 5,950,568, entitled "Foldable/Collapsible Structure", assigned to T. F. H. Publications, Inc., which is directed at a collapsible/foldable structure, and more particularly, to a light-weight animal shelter that can be readily converted into a compact condition for ease of storage and/or transport, and also presents itself as an attractive or classic looking dog house design when fully assembled. Attention is also directed to U.S. Pat. No. 6,131,534, also assigned to T. F. H. Publications, Inc., entitled "Pet Carrier", which is directed to pet carrier transportation device and in particular to a collapsible/foldable pet carrier or portable structure that collapses into a substantially flat configuration for ease of storage when not in use, therein providing a lightweight and portable pet carrier which provides both comfort and good hygiene for the pet, and also provides a safe/sturdy structure for protection during transport.

U.S. Pat. No. 6,345,591 B1 to Amerlon, Inc., entitled "Animal Carrier" is directed at a portable pet carrier having top and bottom platforms as well as front and rear and left and right side pivotably collapsible walls and retaining members. U.S. Pat. No. 5,669,331 provides another example of an apparatus for carrying pets.

Another example of a collapsible pet carriers is found in U.S. Pat. No. 5,493,818 to Wilson. The Wilson device includes a pair of vertical sidewalls that collapse and a hinged roof that collapses over the sidewalls, retaining the sidewalls between the floor and the roof when the device is in a collapsed position.

Yet another known device is found in U.S. Pat. No. 4,484,540 to Yamamoto. The Yamamoto device includes inwardly collapsing walls, a top with four vertical sidewalls and a bottom with four vertical sidewalls. The ends and the collapsing walls nest within the vertical sidewalls of the top and bottom when the device is in a collapsed configuration.

U.S. Pat. Nos. 4,590,885; 4,484,540; 4,527,512; 5,010,848 and 3,896,766 provide additional examples of collapsible pet cages or carriers that are assemblies of hinged fold-up panels.

As one can see from the above art, although certain pet carrier designs have been disclosed which are collapsible, these designs typically contain multiple hinged sections which must fold or stack to reduce volume and become more compact. While successful in their own right, there continues to be a need for even simpler and more lightweight and portable pet carriers which similarly provide comfort for the pet as well as a safe, sturdy structure for protection during transport.

Accordingly, it is a general object of this invention to provide a pet carrier which is lightweight, easy to collapse and expand and which takes up minimal space in a collapsed, ready for storage condition.

It is a further object of this invention to provide a pet carrier which can be easily carried when it is not transporting a pet.

It is still a further object of this invention to provide a pet carrier that is simple, aesthetically pleasing and quick to collapse into a storage or transport condition.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

SUMMARY OF THE INVENTION

A collapsible carrier for an animal comprising a base panel, said base panel having a first end and a second end and containing a floor surface wherein said floor surface includes upwardly extending sidewalls. At least one end member is attached to said upwardly extending sidewalls at either said first or second end of said base panel. Such end member includes a guideway wherein said base panel and said end member define an access opening to said base panel floor surface. A slidable door for closing said access opening is included, wherein said slidable door comprises a leading and a trailing edge including a portion that extends into said guideway of said end member. The slidable door may comprise two separate slidable doors. The slidable door or two separate slidable doors are therefore movable along said guideway in said end member to conform to the shape of said end member thereby extending over said floor surface of said base panel and wherein said slidable door is movable to a retracted position between said upwardly extending sidewalls in said base panel.

In a related embodiment, a collapsible carrier for an animal is disclosed, comprising a base panel, said base panel having a first end and a second end and containing a floor surface wherein said floor surface including upwardly extending sidewalls, first and second members end members hingedly attached to said upwardly extending sidewalls at said first and second ends of said base panel. Each of said end members have guideways wherein the base panel and the end members are configured to define an access opening to the base panel floor surface. A slidable door for closing the access opening is provided, wherein the slidable door comprises a leading and a trailing edge, said leading and said trailing edge extending between said end members, including a portion that extends into said guideway of said end members. The slidable door is movable along the guideway in the end members to conform to the shape of the end members thereby extending over the floor surface of the base panel and the slidable door is also movable to a retracted position between the upwardly extending sidewall in said base panel.

BRIEF DESCRIPTION OF THE DRAWINGS

To better understand and appreciate the invention, refer to the following detailed description in connection with the accompanying drawings.

FIG. 4 is a prospective view of the pet carrier of FIG. 1 in a fully collapsed state ready for storage.

FIG. 5 is an enlarged section view of FIG. 2 taken at Arrow A.

DESCRIPTION OF THE PREFERRED EMBODIMENTS

The present invention provides a carrier for animals and pets that is aesthetically pleasing, lightweight and easy to expand and collapse. By the preferred use of a roll away slidable door along with hinged ends, a complex and bulky apparatus is avoided. Preferably, most of the components which make up the pet carrier are made of plastic which provides light weight, durability, a finished molded surface and ease of cleaning.

In the preferred form of the invention, a pet carrier with slidable doors for closing an access opening to an inside storage area includes a base panel for supporting an animal or pet and provides an area to store the slidable doors when retracted. Preferably parallel end members (i.e., end members that aligned in parallel with one another) are hingedly attached to the support base and are preferably disposed perpendicularly to the base in an extended condition and preferably have symmetrical arcuate edge portion. Such preferred arcuate end members also contain guideways which preferably act to receive rod members which form the leading and trailing edges of the slidable doors. The access opening to the interior of the pet carrier is closeable by means of one or more slidable doors which preferably comprises a plurality of elongated slats which are disposed longitudinally between the arcuate end members and engage with the guideways. The slats are preferably connected to one another by flexible strapping (e.g., cloth/fabric material and/or flexible plastic sheeting) which is spaced apart to form a grid like open structure.

The flexible slidable doors can also be fastened together with a molded carrying handle to securely close the carrier (i.e., the slidable doors are in an extended position over the floor) which allows the carrier to be handled when holding an animal. In a collapsed condition, the slidable door slides with the rod member which is engaged in the guideway and retracts into the base panel. This then allows the end panels to preferably fold inwardly onto the retracted door, forming a compact and convenient collapsed storage container. The handle thus becomes a carrying handle for the collapsed carrier.

Figure 1:
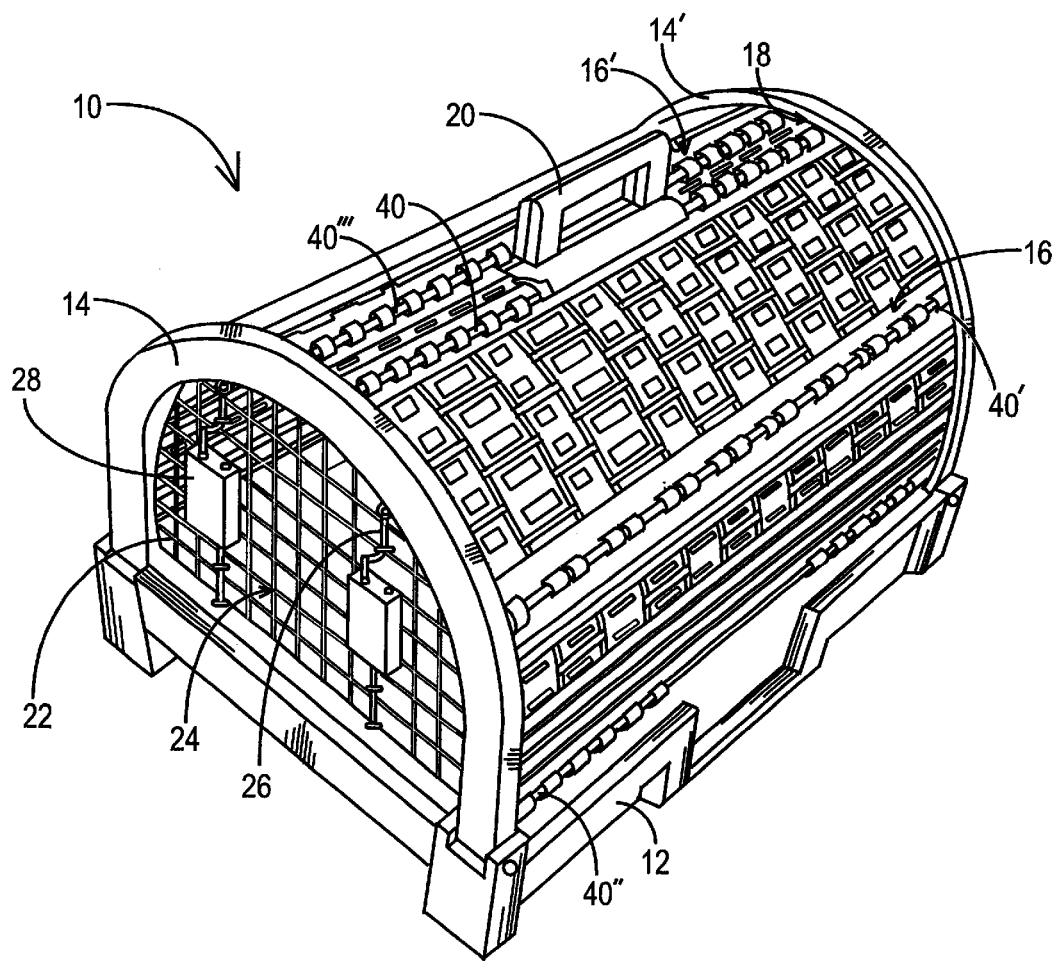
FIG. 1 is a prospective view of one embodiment of the collapsible pet carrier of the present invention.

FIG. 1 is a perspective View of the current invention illustrating the preferred collapsible pet carrier 10 in its fully expanded condition suitable for storing or transporting an animal or pet. The carrier 10 is comprised of a base support panel 12 which forms the floor of the pet carrier, two arcuate end members 14 which are hingedly attached to upwardly extending sidewalls 13 of the base panel 12 and two slidable doors 16, 16' which are slidably engaged in guideway 18 in the end members 14. Thus, the access opening at the top of the pet carrier 10 is closed by slidable doors 16, 16' slidably movable along elongated guideways 18 in the end members 14, 14'. The elongated guideways 18 are preferably undercut slots disposed along a symmetrical arcuate edge portion of the end members 14, 14'.

As shown in FIG. 1, in an extended condition, the slidable doors 16, 16' prevent access to the interior of the carrier 10 through a split handle 20 that latches the slide door 16, 16' together. The end members 14, 14' may be molded of plastic including a center grid section or, as shown in FIG. 1, may comprise a wire grid 22 which is attached to the plastic molding. Optionally, either or both of the end members 14, 14' may include a traditional pet cage access door 24 which may comprise hinges 26 and a latch 28 to allow access to the interior of the carrier.

Figure 2:
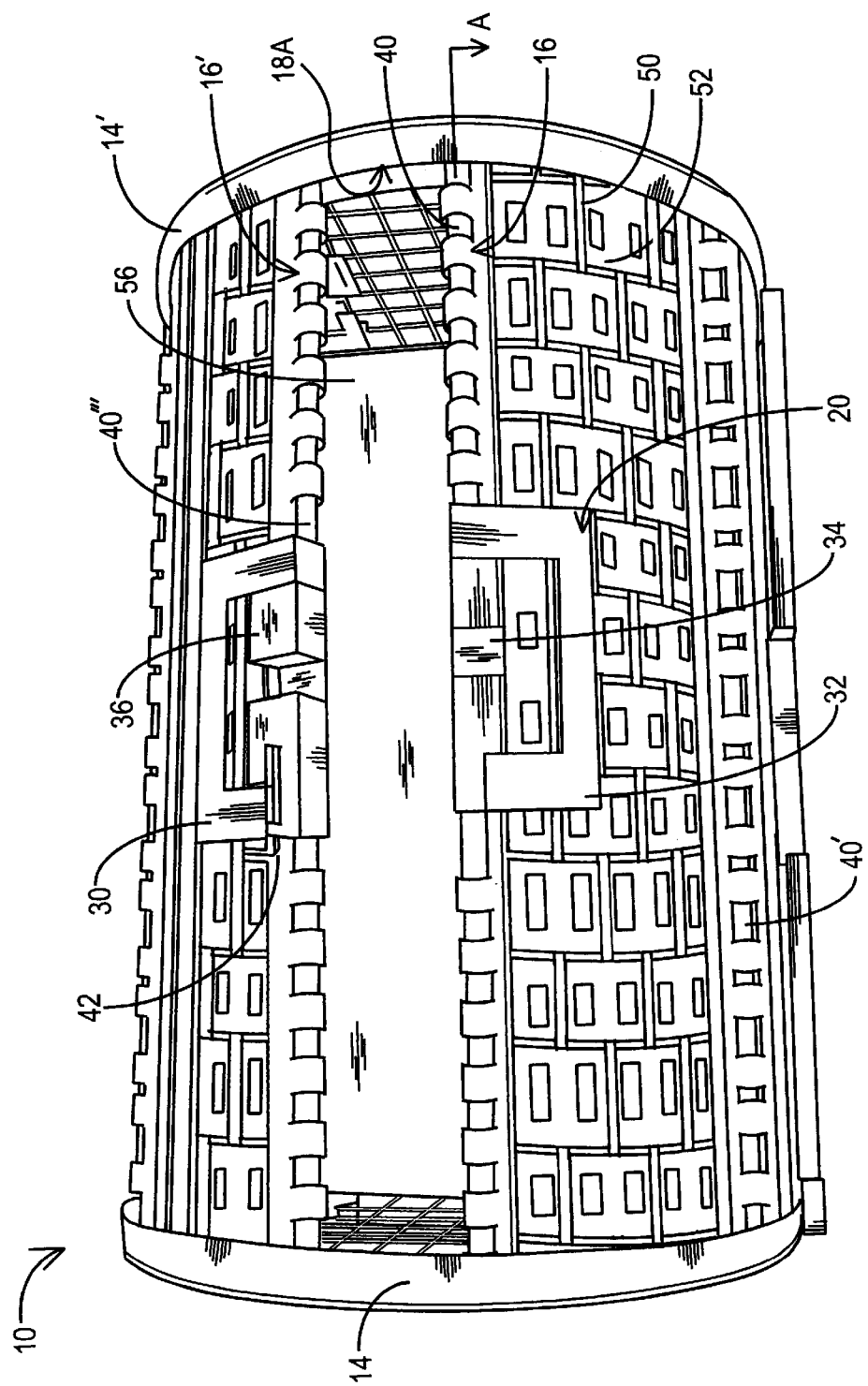
FIG. 2 is s top view of the pet carrier of FIG. 1 with the slidable doors partially open.

Turning to FIG. 2, a top view of the pet carrier 10 of the present invention is shown with the slidable doors 16, 16', partially open and the split handle 20 unlatched. The split handle 20 is molded in two sections 30 and 32 which have mating features 34 and 36 which engage to form a carrying handle for the pet carrier. The sections 30 and 32 are also preferably attached to rods 40, 40''' which form the leading edges of the slidable doors 16, 16'. When the handle sections 30 and 32 are engaged together they urge the leading edge of the slide door 16, 16' close together to prevent access to, or escape from, the top of the pet carrier 10. Latching of the handle 20 through engagement of sections 30, 32 is provided by a spring loaded pin 42 which can be retracted to allow engagement of the handle section 30, 32, then released to slide through a hole that extends through both sections 30, 32 preventing separation. The slidable doors 16, 16' as shown in FIG. 2 may comprise any of a flexible sheet or open mesh grid or weave to allow ventilation as well as allowing slidable movement along the arcuate shape of the end members 14, 14'. While the slidable doors 16, 16' may be one or a plurality of doors, a preferred embodiment comprises two doors having a grid or lattice structure which are further comprised of longitudinal slats 50 which engage with a guideways 18 in each arcuate end member 14, 14' and lateral straps 52 which interconnect the slats 50 and are flexible to allow the slats to articulate yet remain interconnected.

The slidable doors 16, 16' also comprise rod members (see FIG. 1) 40, 40' at the leading and trailing ends of the slidable doors as well as at intermediate points to ensure that the end members 14, 14' will not separate. Optionally, the slidable doors 16, 16' may be of a unitary molded flexible grid structure which engages the guideways 18 in the end members 14, 14' and are capable of preventing access to the pet carrier from the top.

Figure 3:
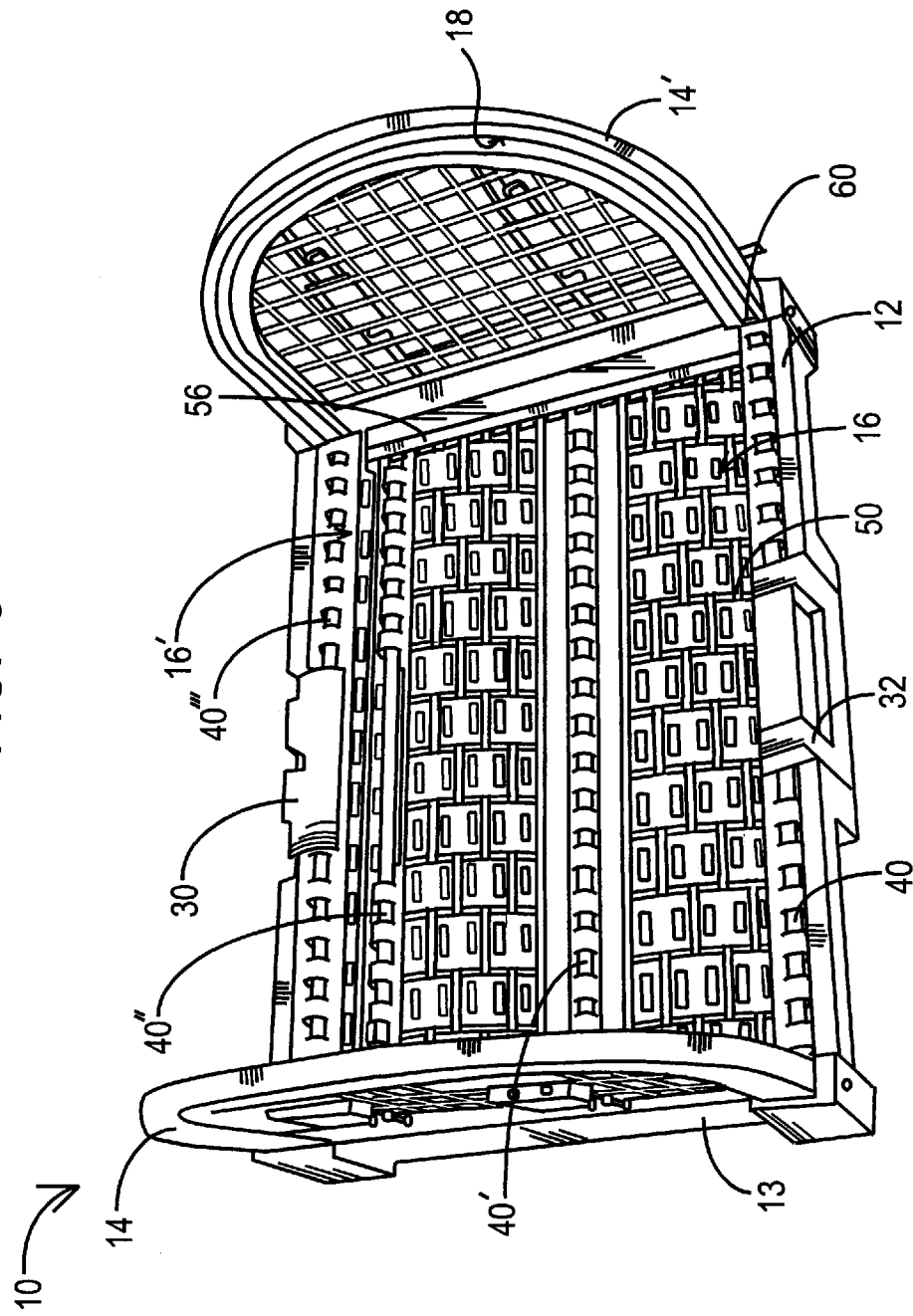
FIG. 3 is a prospective view of the pet carrier of FIG. 1 with the slidable doors fully retracted into the base.

FIG. 3 shows the pet carrier of the present invention in a partially collapsed condition with the slidable doors 16, 16' retracted into the base panel 12. Here, the rod members 40, 40', 40", 40'" and slat/strap 50/52 provide an interconnected structure that has been retracted into base panel 12 by moving the rod members down along the guideways 18 in the arcuate end member 14, 14'. A set of ribs 56 projecting from the inner wall of the upwardly extending sidewalls 13 at each end of the base panel 12 preferably provides tracking of the slidable door 16, 16' such that the trailing edge travels across the base member 12 so that when fully retracted the doors 16, 16' are stored one above the other in overlapping relationship. This is shown in FIG. 3 where split handle 32 is retracted into a storage space in the base panel 12 and door 16 and rods 40, 40' and 40" overlie door 16' which contains split handle 30 and rod member 40'".

Since most of the components are plastic in the present invention they inherently slide easily along one another to readily provide both the retracted and extended carrier position. FIG. 3 shows additional features of the slidable door wherein the rod members 40, 40', 40", 40'" preferably comprise a flared end 60, but optionally a ball or roller, that engages with an undercut slot which comprises the guideway 18 in each end member 14, 14' to provide tracking of the doors 16, 16' when they are extended to prevent access to the interior of the pet carrier. Preferably, only the rod members 40, 40', 40", 40'" will have flared ends 60 or roller bearings to provide smooth operation of the slidable doors 16, 16' and the longitudinal slats 50 will fit loosely into the guideway 18 but not engage the undercut. This provides less resistance to operation of the doors. The flared ends 60 of the rod member 40, 40', 40", 40'" also provide retention of the end members 14, 14' in a position parallel to each other and perpendicular to the base panel 12, preventing the animal or pet contained in the carrier from escaping.

FIG. 4 is a view of the pet carrier in a fully collapsed condition ready for storage. The slidable doors have been fully retracted into the base panel 12 and the end members 14, 14' have been folded down flat on top of the retracted doors to provide a neat compact package for storing or transport without the pet. The handle section 30 may remain retracted or folded out to use in carrying the collapsed pet carrier.

Operation of expanding the pet carrier from a collapsed condition will now be described. To expand the pet carrier 10 from a collapsed condition as shown in FIG. 4 to an expanded condition as shown in FIG. 1, the end members 14, 14' are pivoted about their hinge point 72, 72' with the base member 12 to a perpendicular position as shown in FIG. 3. The slidable doors 16, 16' are then drawn upward by grasping the split handle sections 30, 32 and advancing the leading edge rod members 40, 40'" upward between the end members 14, 14'. Movement of the doors 16, 16' is facilitated by flared ends 60 of the leading rod members 40, 40'" which act as guides which engage in the undercut slots of the guideway 18 of the end members 14, 14'. In can therefore be appreciated that in such operation the slidable doors are preferably arranged so that they trace out an arc when they are extended or retracted which could therefore be described as a roll-away or roll-top wall structure.

Additional details of the present invention are shown in FIG. 5. The leading edge and trailing edge rods 40 comprises a flared end 60 which engage with a guideway 18 comprising a dielocked slot in the end member 14. In an extended condition this feature ensures that the end members remain parallel to each other and perpendicular to the base panel. This feature further ensures that the animal inside the carrier does not have an easy path to the outside. The slidable doors 16, 16' thus extend upward following the shape of the guideway 18 until the doors meet at the top of the pet carrier 10 and the handle sections 30, 32 (FIG. 1) engage and are latched together to close off the pet carrier. The slidable doors may comprise a plurality of interwoven or interconnected slats and straps or flexible sheet material which can articulate to follow the arcuate shape of the guideway.

Further, since the lateral strap members are quite flexible, preferably fabric or plastic, the slats can compress together somewhat for storage in the base panel 12. In a preferred embodiment (see FIG. 2) the longitudinal slats 50 are of a somewhat rigid plastic, such as ABS, polystyrene, filled polyolefines, polycarbonate, and other suitable thermoplastic or thermoset materials, and the lateral straps 52 are of a more flexible plastic, such as polyethylene film, thermoplastic/thermoset elastomers, or are comprises of a fabric and are sewn to the slats. Further, each slidable door 16, 16' may comprise a plurality of grid sections of interconnected slats 50 and straps 52 which are connected by a plurality of rods which serve to prevent binding of the doors during sliding operation and allow attachment of the slidable doors to the end member 14,14' and to each other via the split handle 20.

In addition, optionally, a slot or recess can be included in the base panel 12 to facilitate the ability of the carrier 10 to be latched or secured in a vehicle. For example, a seatbelt of appropriate tie-down cord can be routed through such slot or recess thereby securing the carrier from movement during transportation.

While the invention is described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention. In addition, it should be understood herein that within the broad scope of this invention, the various features disclosed in all of the optional and preferred embodiments are interchangeable, and a particular feature of any one embodiment would be readily implemented and applied in any of one of the several other alternative and preferred embodiments.

What is claimed is:

1. A collapsible carrier for an animal comprising:
 a base panel, said base panel having a first end and a second end and containing a floor surface wherein said floor surface includes upwardly extending sidewalls;

first and second end members hingedly attached to said upwardly extending sidewalls at said first and second ends of said base panel;

said end members having guideways wherein said base panel and said end members define an access opening to said base panel floor surface;

a slidable door for closing said access opening, wherein said slidable door comprises a leading and a trailing edge, said leading and said trailing edge extending between said end members, including a portion that extends into said guideway of said end members;

wherein said slidable door is slidably engaged and movable along said guideway in said end members to conform to the shape of said end members thereby extending over said floor surface of said base panel and wherein said slidable door is slidably movable along said guideway to a retracted position between said upwardly extending sidewalls in said base panel.

2. The collapsible carrier of claim 1 wherein said upwardly extending sidewalls include projecting ribs which form a guideway for said slidable door.

3. The collapsible carrier of claim 1 wherein the guideways in said end members comprises a portion that defines an arcuate shape.

4. The collapsible carrier of claim 1 wherein said guideways in said end members are symmetrical to one another.

5. The collapsible carrier of claim 1 wherein said guideways comprise a slot with an undercut.

6. The collapsible carrier of claim 5 wherein said portion of said leading and trailing edge that extends into said guideway comprises a flared portion that engages with said undercut.

7. The collapsible carrier of claim 1 wherein either of said first or said second end members include a grid structure.

8. The collapsible carrier of claim 1 wherein either of said first or said second end members include a door.

9. The collapsible carrier of claim 8 wherein said door comprises a grid structure.

10. The collapsible carrier of claim 1 wherein said slidable door is in a retracted position between said upwardly extending sidewall in said base panel and said end members that are hingedly attached to said upwardly extending sidewalls are in a folded configuration and lie over said slidable door.

11. The collapsible carrier of claim 1 wherein said slidable door includes a plurality of slats wherein said slats are connected to one another and include a portion that extends into said guideway.

12. The collapsible carrier of claim 1 wherein said slidable door comprises a flexible sheet.

13. The collapsible carrier of claim 1 wherein said slidable door comprises a grid structure.

14. A collapsible carrier for an animal comprising:

a base panel, said base panel having a first end and a second end and containing a floor surface wherein said floor surface includes upwardly extending sidewalls;

first and second end members hingedly attached to said upwardly extending sidewalls at said first and second ends of said base panel;

said end members having guideways wherein said base panel and said end members define an access opening to said base panel floor surface;

at least two slidable doors for closing said access opening, said slidable doors comprising a leading and a trailing edge, said leading and said trailing edge extending between said end members, including a portion that extends into said guideways of said end members;

wherein said slidable doors are slidably engaged and movable along said guideway in said end members to conform to the shape of said end members thereby extending over said floor surface of said base panel and wherein said slidable door is slidably movable along said guideway to a retracted position between said upwardly extending sidewalls in said base panel.

15. The collapsible carrier of claim 14 wherein said slidable doors each include a handle for carrying said container.

16. The collapsible carrier of claim 14 wherein the first and second end members include a top portion and wherein said leading edges of said slidable doors are movable along said guideway towards said top portion in said end members.

17. The collapsible carrier of claim 16 wherein said slidable doors each include a handle wherein said handle includes mating sections.

18. The collapsible carrier of claim 17 wherein said mating sections of said handles engage one another and wherein said mating sections includes a rod that extends through said mating sections.

19. The collapsible carrier of claim 17 wherein said rod is tensioned by a spring to direct said rod through said mating sections.

20. A collapsible carrier for an animal comprising:

a base panel, said base panel having a first end and a second end and containing a floor surface wherein said floor surface includes upwardly extending sidewalls;

at least one end member attached to said upwardly extending sidewalls at either said first or second end of said base panel;

said end member having a guideway wherein said base panel and said end member defines an access opening to said base panel floor surface;

a slidable door for closing said access opening, wherein said slidable door comprises a leading and a trailing edge, including a portion that extends into said guideway of said end member;

wherein said slidable door is slidably engaged and movable along said guideway in said end member to conform to the shape of said end member thereby extending over said floor surface of said base panel and wherein said slidable door is slidably movable along said guideway to a retracted position between said upwardly extending sidewalls in said base panel.

21. The collapsible carrier of claim 20 wherein said at least one end member is hingedly attached to said upwardly extending sidewalls.

\* \* \* \* \*